United States Patent
Widdup

(10) Patent No.: US 6,651,148 B2
(45) Date of Patent: Nov. 18, 2003

(54) HIGH-SPEED MEMORY CONTROLLER FOR PIPELINING MEMORY READ TRANSACTIONS

(75) Inventor: Benjamin John Widdup, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/861,576

(22) Filed: May 22, 2001

(65) Prior Publication Data

US 2002/0019911 A1 Feb. 14, 2002

(30) Foreign Application Priority Data

May 23, 2000 (AU) .............................................. PQ7689
May 23, 2000 (AU) .............................................. PQ7690

(51) Int. Cl.⁷ .......................................... G06F 13/00
(52) U.S. Cl. ..................... 711/158; 711/151; 711/167; 710/240; 710/241; 710/242; 710/243; 710/244
(58) Field of Search ............................... 710/240–244; 711/158, 167, 151

(56) References Cited

U.S. PATENT DOCUMENTS

| | | | | | |
|---|---|---|---|---|---|
| 5,280,591 | A | * | 1/1994 | Garcia et al. ................. | 710/111 |
| 5,440,713 | A | * | 8/1995 | Lin et al. ...................... | 711/158 |
| 5,812,775 | A | * | 9/1998 | Van Seters et al. .......... | 709/213 |
| 5,953,691 | A | * | 9/1999 | Mills ........................ | 348/391.1 |
| 6,092,158 | A | * | 7/2000 | Harriman et al. ............ | 710/240 |
| 6,108,692 | A | * | 8/2000 | Van Seters et al. .......... | 709/213 |
| 6,119,196 | A | * | 9/2000 | Muller et al. ................ | 710/240 |
| 6,286,083 | B1 | * | 9/2001 | Chin et al. ................... | 710/116 |
| 6,315,505 | B1 | * | 11/2001 | Moore .......................... | 407/35 |
| 6,317,813 | B1 | * | 11/2001 | Su et al. ...................... | 711/151 |
| 6,415,367 | B1 | * | 7/2002 | Baxter et al. ................ | 711/158 |

FOREIGN PATENT DOCUMENTS

WO    WO 99/00736    1/1999

* cited by examiner

*Primary Examiner*—Than Nguyen
(74) *Attorney, Agent, or Firm*—Fitzpatrick, Cella, Harper & Scinto

(57) ABSTRACT

A memory controller (218) is disclosed which includes a write arbiter (130) and a read arbiter (140) for receiving and processing memory requests from a number of requestor modules (190) for accessing a high speed memory device (110). A high speed controller (120) controls data flow to and from the high speed memory device (110) at a frequency that is higher than all operating of the arbiters (130, 140), allowing pseudo-simultaneous memory transactions. A read data dispatcher (160) is also disclosed for receiving data from the high speed controller (120) in response to read transactions and for passing the data to one of the requestor modules (190). The size and destination information for launched read transactions are kept by a queue 150. When return data is received by the read data dispatcher (160), the read data dispatcher (160) matches the appropriate amount of data with each queue entry and delivers that return data to the appropriate requester module (190).

7 Claims, 6 Drawing Sheets ruled to operates at a frequency that is higher than a
HIGH-SPEED MEMORY CONTROLLER FOR PIPELINING MEMORY READ TRANSACTIONS

TECHNICAL FIELD OF THE INVENTION

The current invention relates to a memory controller in an application specific integrated circuit (ASIC), and in particular, to a distributed memory controller scheme for controlling high speed memory devices.

BACKGROUND ART

A computer system relies on memory to store instructions and data that are processed by a computer system processor. In a typical computer system, the computer system processor communicates with the computer memory via a processor bus and a memory controller. Breathtaking advances have been made in both the storage capacity and speed of computer memory devices. Traditionally, the speed of memory devices has not been able to keep pace with the speed increases achieved with microprocessors and ASICs. Consequently, the speed of traditional computer systems is limited by the speed in which data and instructions can be accessed from the memory devices of the computer system.

However with the development of high speed/high bandwidth memory devices, such as provided by the memory architecture RAMBUS®, the situation has changed in that it is difficult for memory controllers to make full use of the higher bandwidth made available by such high speed memory devices, particularly when a system clock speed driving these memory controllers is slower than a clock speed of the high speed memory device.

Similarly, in a system where the memory device has a wider bus interface than application logic accessing the memory device, the application logic causes a bottleneck for data flow to and from the memory device, thereby wasting precious bandwidth. A similar situation exists in the case of high speed serialised buses (such as those provided by the RAMBUS® architecture), where the memory device has a wider effective bus interface than the application logic.

A need therefore exists for a system architecture that make better use of the increased speed/bandwidth modern memory devices provide.

DISCLOSURE OF THE INVENTION

It is an object of the invention to substantially overcome, or at least ameliorate, one or more disadvantages of existing arrangements.

According to a further aspect of the invention, there is provided a hierarchical memory controller for allowing pseudo-simultaneous memory transactions to and from a memory device in response to memory write and memory read requests from at least one requestor module, said hierarchical memory controller comprising:

at least two arbiters for receiving and processing said memory requests; and a controller module for controlling data flow to and from said memory device in response to signals from said at least two arbiters, said controller module being configured to operates at a frequency tat is higher than an operating frequency of said arbiters.

According to a further aspect of the invention, there is provided a method of allowing pseudo-simultaneous memory transactions to and from a memory device in response to memory write and memory read requests from at least one requester module, said method comprising the steps of:

receiving and processing said memory requests by at least two arbiters; and controlling data flow to and from said memory device in response to signals from said at least two arbiters by a controller module, said controller module being configured to operates at a frequency that is higher than a operating frequency of said arbiters.

According to a further aspect of the invention, there is provided a memory controller for controlling memory transactions to and from a memory device in response to memory requests from at least one requester module, said memory controller comprising:

at least one arbiter for receiving and processing said memory requests;

a controller module for controlling data flow to and from said memory device in response to signals from said at least one arbiter; and a data dispatcher for receiving data from said controller module in response to a memory read transaction and for passing said data to said one requestor module.

According to a further aspect of the invention, there is provided a method of launching memory transactions to and from a memory in response to memory requests from at least one requester module without waiting for completion of a previous memory transaction, said method comprising the steps of:

receiving and processing said memory read requests by at least one arbiter;

controlling data flow to and from said memory device in response to signals from said at least one arbiter by a controller module;

receiving data from said controller module in response to a memory read transaction by a data dispatcher; and passing said data to said one requester module.

BRIEF DESCRIPTION OF THE DRAWINGS

One or more embodiments of the present invention will now be described with reference to the drawings, in which.

DETAILED DESCRIPTION INCLUDING BEST MODE

Figure 1:
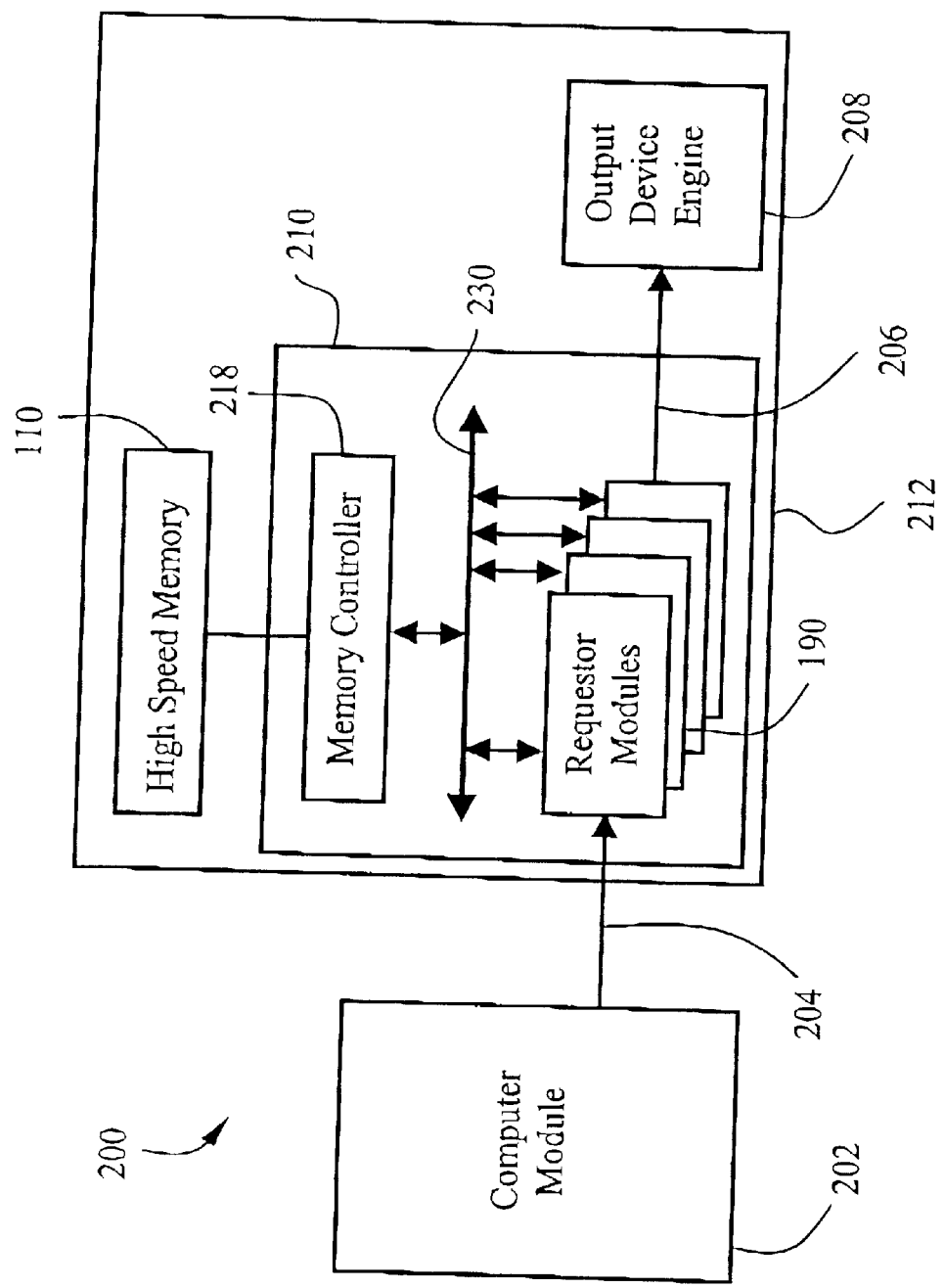
FIG. 1 is a schematic block diagram of a system in which a rendering application specific integrated circuit may be implemented.

FIG. 1 shows a schematic block diagram of a system 200 in which a memory controller 218 may be practiced. The system 200 comprises a computer module 202 connected through interface 204, which is typically a Peripheral Component Interconnect (PCI), to an output device 212 such as a printer or a monitor.

The output device 212 includes a rendering Application Specific Integrated Circuit (ASIC) 210, an output device engine 208 and a high-speed memory device 110. The rendering ASIC 210 receives from the computer module 202 a page description for rendering, and produces raw pixel data to the output device engine 208 through connection 206. The raw pixel data is a uncompressed bitmap of the render page.

The rendering ASIC 210 includes a number of requestor modules 190, each of which is coupled via a memory bus 230 to the memory controller 218. Each requestor module 190 receives input from interface 204 or from another requestor module 190 and each performs a different stage of the overall rendering process, converting the page description from the computer nodule 202 to the bitmap of the render page. The requestor modules 190 and the memory controller 218 typically communicate via the memory bus 230 in a manner known to those in the relevant art.

Figure 2:
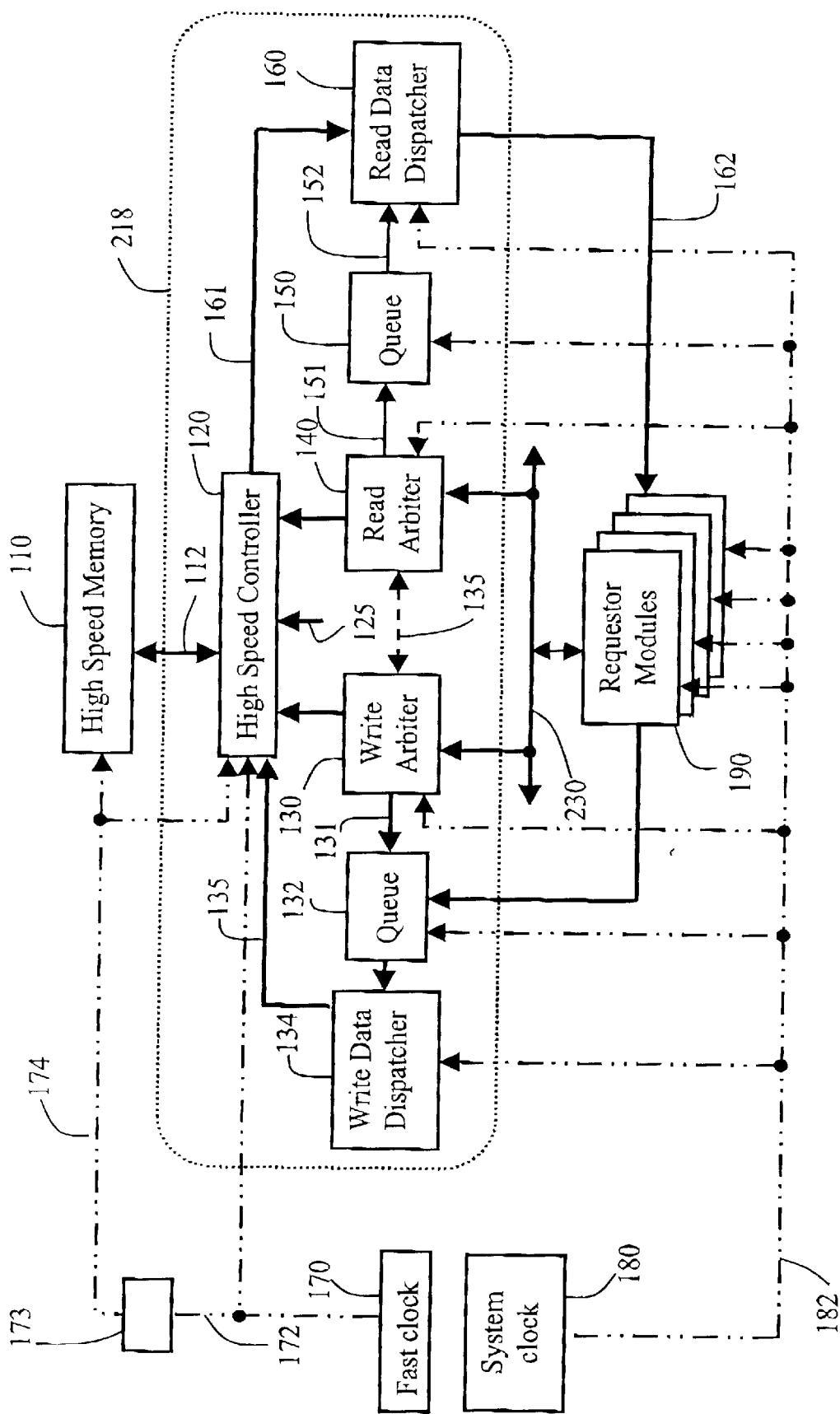
FIG. 2 is a detailed schematic block diagram of the rendering application specific integrated circuit.

FIG. 2 shows a detailed schematic block diagram of the rendering ASIC 210. The requestor modules 190 are slower than the high-speed memory device 110 and are connected to a system clock 180 via a clock tree 182. A high-speed clock 170, connected to a high-speed controller 120 via a clock tree 172, runs at a higher frequency than that of the system clock 180. Also connected to the clock tree 172 is a clock multiplier 173, providing to the high-speed memory device 110 through clock connection 174 a clock with a higher frequency than that of the high-speed clock 170. The clock connection 174 is also connected to the high-speed controller 120 to allow synchronous communication between the high-speed controller 120 and the high-speed memory device 110.

The high-speed controller 120 controls the manner in which data is written to or read from the high-speed memory device 110 via serialised bus 112. Commonly, a high-speed controller 120 is a speed critical module, with memory latency typically being a performance bottleneck due to it causing a reduction in the overall bandwidth. Read/write parallelism and pipelining are methods employed to boost overall system performance of such a system 200. Therefore, in order for the memory controller 218 to better match the performance of the high-speed memory device 110, the memory controller 218 performs pseudo-simultaneous transactions by having components of its circuit running at a higher speed than the slower and more complex requestor modules 190.

The memory controller 218 of the preferred implementation is provided with a number of arbiters, including a read arbiter 140 and a write arbiter 130, each for receiving read and write memory requests respectively, from the requester modules 190 via memory bus 230. This provides a memory controller 218 with hierarchical arbitration. Each arbiter 130 and 140 can process a request from the requester modules 190 independently, allowing these requests to be handled by the arbiters 130 and 140 in parallel. These parallel requests may be granted by the high-speed controller 120 in adjacent clock cycles of the high-speed clock 170. For example, both a read request and a write request from the requestor modules 190 can be granted in the same clock cycle of the system clock 180. This allows for the two requests to occur in the same clock cycle, or simultaneously with regard to the system clock 180.

Arranging the clocks 170 and 180 in this manner also reduces the effect of memory refreshes from a refresh signal 125, in which existing memory contents are refreshed, interfering with memory transactions less than if processed by a section connected to the system clock 180 in which data is written to or read from the memory.

Figure 4A:
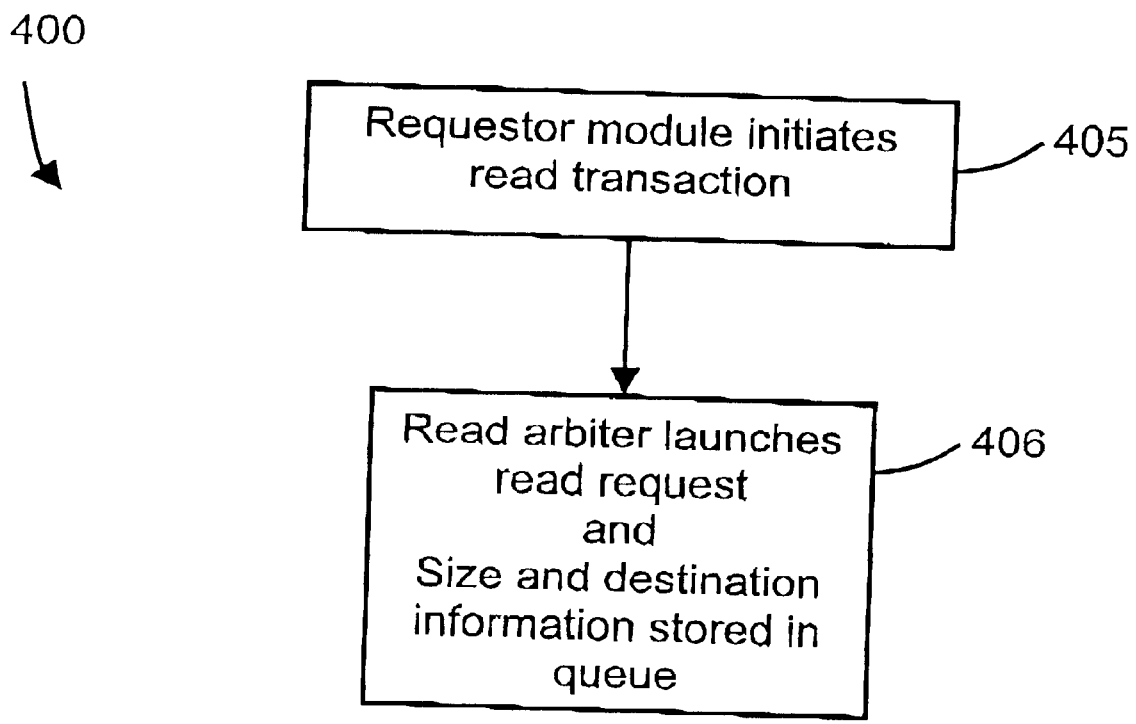
FIGS. 4A, 4B and 4C are flow diagrams of methods of writing and reading data to and from requestor modules.

To further increase the speed of the memory controller 218, a separate read data dispatcher 160 is provided, allowing read transactions to be heavily pipelined. Also referring to FIG. 4A where a flow diagram of a method 400 of initiating reading transactions from the high-speed memory device 110 is shown, a read transaction is as initiated by a requester module 190 by sending a read transaction to the read arbiter 140 in step 405. A read request is launched from the read arbiter 140 to the high-speed controller 120 in step 406, while the size and destination information about the launched read request is passed to a queue 150 via link 151. The queue 150 keeps entries of size and destination information about the launched read request.

Figure 4B:
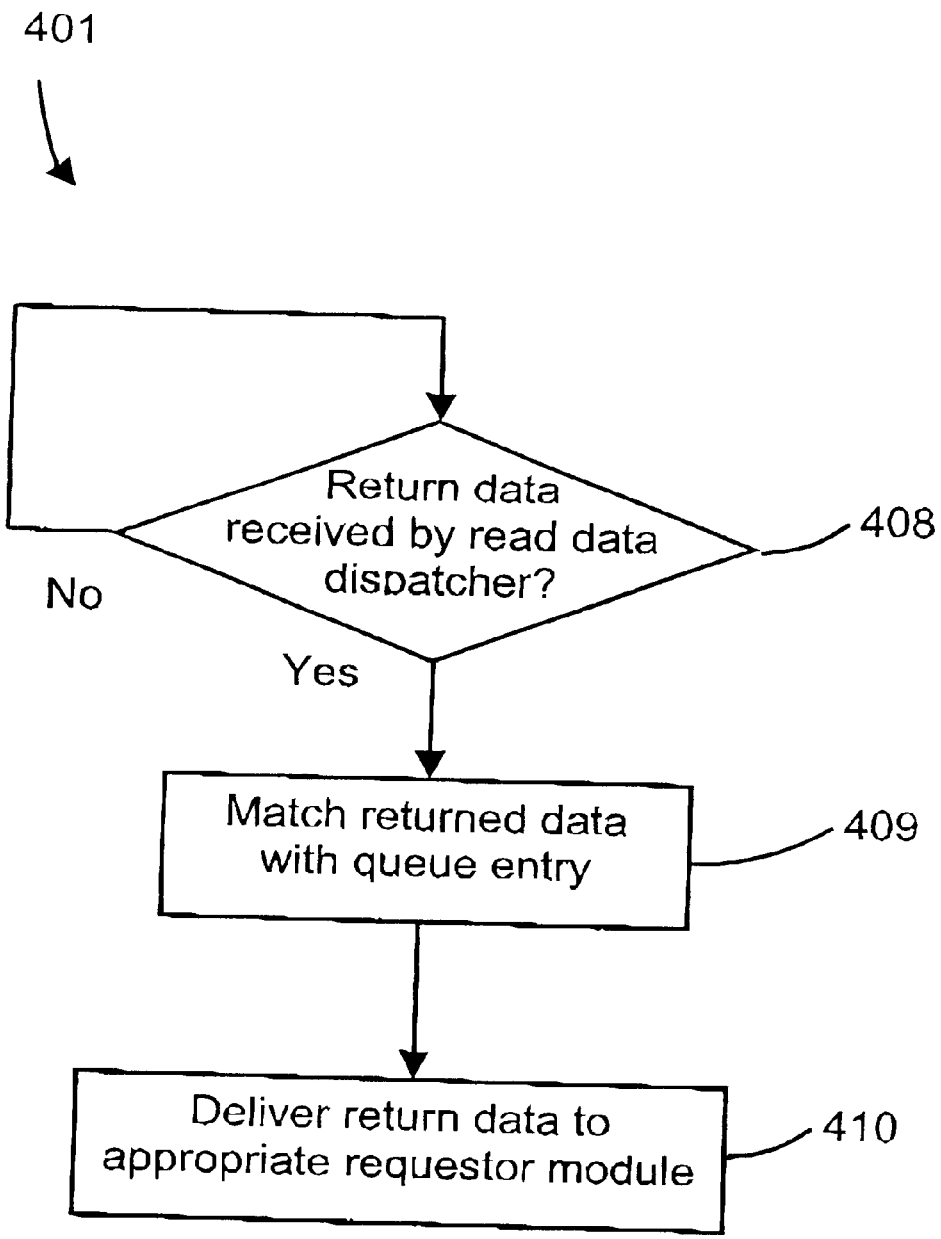

FIG. 4B shows a flow diagram of a method 401 performed when return data from the high-speed controller 120 is returned to the read data dispatcher 160 via link 161. When return data is received by the read data dispatcher 160 in step 408, the read data dispatcher 160 matches in step 409 the appropriate amount of return data with each queue entry, received via link 152, and delivers in step 410 that return data to the appropriate requester module 190 via link 162. The appropriate requester module 190 is determined from the entry from the queue 150.

This arrangement allows multiple read requests to be launched from the read arbiter 140 without having to wait for return data. This allows the read arbiter 140 to be further simplified, enabling it to operate with lower latency and deeper pipelining, because the read arbiter 140 does not have to keep track of, or know the required destination of return data of launched requests.

The read data dispatcher 160 works independently from the read arbiter 140 and high-speed controller 120, by merely matching entries from the queue 150 with return data, as they arrive. As memory systems become more advanced and capable of pipelining even more transactions, the length of the queue 150 can simply be increased to accommodate this completely, without any change to the architecture. Hence, this architecture allows a second read request from the same requestor module 190 to be accepted before a former read request has finished.

Figure 4C:
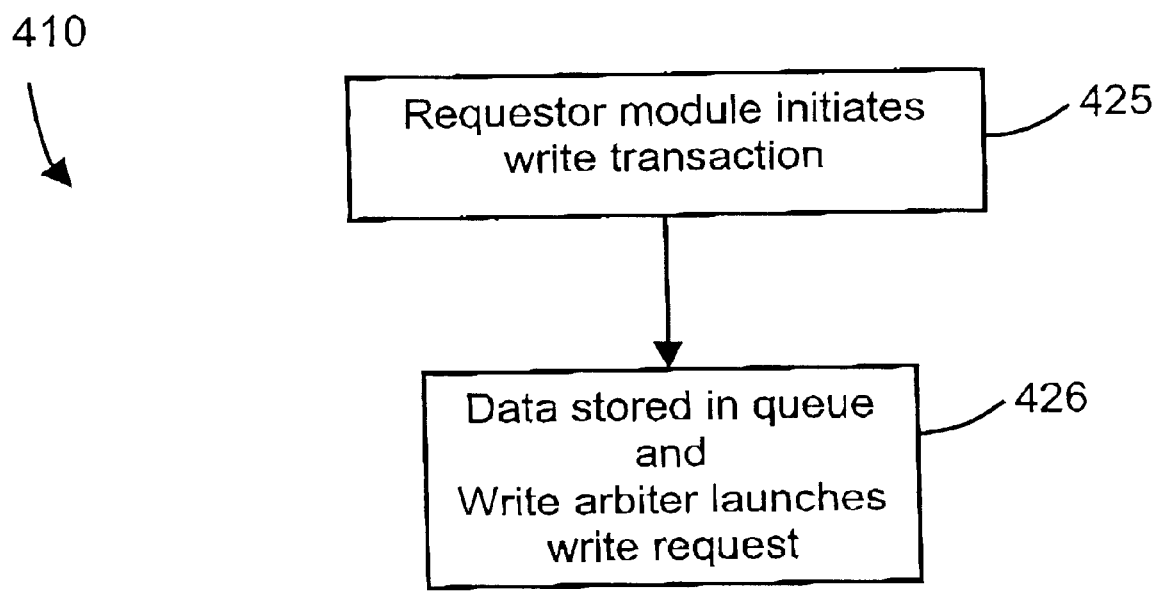

Also provided is a write data dispatcher 134 for allowing write transactions to be pipelined. Also referring to FIG. 4C where a flow diagram of a method 420 of writing data to the high-speed memory device 110 is shown, a write transaction is initiated by a requestor module 190 by sending a write transaction to the write arbiter 130 in step 425. A write request is launched from the write arbiter 130 to the high-speed controller 120 in step 426, while the data for the launched write request is passed 427 to a queue 132 via link 131, where it is stored in a FIFO memory. When the write request is granted, the data is passed to the high-speed controller 120 via the write data dispatcher 134 and link 135. This arrangement also allows multiple write requests to be launched from the write arbiter 130.

The read arbiter 140 and write arbiter 130 arbitrate requests from the requestor modules 190, perform any address calculation, checks and transaction splitting as necessary. In the preferred implementation the read arbiter 140 and write arbiter 130 add a base address to the requested address to calculate the absolute address. The read arbiter 140 and write arbiter 130 additionally check if the address is out of range, and report errors when they occur. Long read and write transactions from the requestor modules 190 are split up into smaller transactions, removing the need for the high-speed controller 120 to be concerned with page faults and arbitrary length transactions, thereby simplifying the high-speed controller 120, allowing it to be faster.

The choice of having a separate read and write arbiter 140 and 130 is due to two main considerations namely:

1. Simplification of the arbiter 130 and 140 design. In order to achieve the maximum bandwidth of the high-speed controller 120, pipelining of requests and buffering of both read and write data are essential. Segregated write and read arbiters 130 and 140 not only allow pipelining of the requests, it also allows each arbiter 130 and 140 to have simpler buffering requirements. In the case of dual port memory, such as high-speed memory device 110, one port may be a dedicated read port while the other port is a dedicated write port. The destination and size information about read transactions may be stored in a simple FIFO queue, such as queue 150. Similarly, information about write transactions may be stored in a simple FIFO queue 132 associated with the write arbiter 130.

2. Reduction of high-speed memory device 110 bubble cycles. In the high-speed memory device 110, when consecutive memory transactions are performed, then, dependent upon whether the transactions are addressed to a same bank in the high-speed memory device 110, adjacent banks or a different high-speed memory device 110, a number of hold off bubble (wait) cycles must be inserted between the start of the two memory transactions. The number of hold off bubble cycles also depend on a gear ratio, which is the ratio between high-speed clock 170 frequency and the system clock 180. Table 1 shows the hold off bubble cycle requirement between two consecutive transactions for gear ratio 4/3.

return data from the high-speed controller 120, a FIFO controller (not illustrated) of the queue 150 doesn't need an empty flag.

Dependent upon the nature of the priority scheme used, it is possible that a write transaction to address k is processed after a read transaction to the same address k, even if the write arrived before the read transaction. Hence, there is a memory coherency problem that must be solved. Because of the speed requirement, it is difficult to perform any address comparison in the high-speed controller 120 to detect when there is an address conflict and therefore a coherency problem. Coherency checking 135 is therefore performed in the read arbiter 140 and write arbiter 130. In the preferred implementation, read transactions have priority over write transactions, and the address of the current and previous write transactions is compared with the address of the current read transaction. The requirement to perform address comparison also on the address of the previous write transaction is due to the pipelining of write transactions by the high-speed controller 120. In the event of an overlap, the read arbiter 140 simply postpones the read transaction until the write transaction has been processed and then for 1 additional clock cycle. This delay is enough to guarantee that the write transaction is processed before the read

TABLE 1

| Transaction Sequence | Same memory device, same or adjacent banks | Same memory device, non-adjacent banks | Different memeory devices |
|---|---|---|---|
| RD followed by RD | 3 hold off bubbles | None | None |
| WR followed by WR | 3 hold off bubbles | None | None |
| RD followed by WR | 3 hold off bubbles | 1 hold off bubble | 1 hold off bubble |
| WR followed by RD | 3 hold off bubbles | 2 hold off bubbles | None |

In order to increase the bandwidth, it is important to reduce the hold off bubble cycles. One way of doing so is to have the separate read and write arbiters 140 and 130, as it increases the possible options in choosing memory transactions to dispatch. For example, if it is assumed that the high-speed controller 120 has just performed a read transaction with the high-speed memory device 110. As a next transaction it may choose between another read transaction or write transaction, (assuming there are read and write transactions pending). The high-speed controller 120 may determine from the address of the pending transactions which transaction would require less hold off bubble cycles.

Further checks may be made if necessary by the read arbiter 140 and write arbiter 130, which may include memory coherency checks 135 This re-allocation of functionality from the high speed domain to the low speed domain, allows the high-speed controller 120 to be as simple as possible, and therefore as fast as possible.

The high-speed controller 120, in the preferred implementation, may take requests from at least two arbiters 130 and 140 and refreshes (not illustrated). Furthermore, in the preferred implementation, to simplify and speed up the high-speed controller 120, memory transactions are implemented in bursts that are limited to 4 words per burst.

Furthermore, the queue 150 of the preferred implementation is a simple FIFO queue containing as entry, destination and size information about the read transactions. This allows the high-speed controller 120 to simply return all return data to the read data dispatcher 160. Since the queue 150 will always receive the destination information of a read transaction before the read data dispatcher 160 receives the transaction, thus solving the coherency problem described above. The address comparison is not made if either of the read transaction address or the write transaction address is invalid.

The high-speed controller 120 may have more read and write arbiters 130 and 140, as the application requires. However, there must be mechanisms preventing two (or more) arbiters 130 and 140 from simultaneously processing the same transaction. One such method is by mutual exclusion, with one arbiter 140 processing reads only, another processing writes from the even numbered requester modules 190 only and a third processing writes from odd numbered requestor modules 190. Access to arbiters 130 and 140 in the preferred implementation is by a semi-programmable, non-rotating priority scheme (i.e. fixed priority for at least some of the requestor modules 190), designed to optimise access to the scarce resource, namely the high-speed memory device 10.

Once a transaction is granted by the high-speed controller 120, the memory controller 218 guarantees that transactions will be completed. Obviously the event where a reset is performed on the computer system is excluded. Requestor modules 190 do not have a stalling signal, so they are expected to be able to send or receive the entire burst in as many clock cycles, although they may be stalled. This prevents any requestor module 190 from slowing down the rest of the memory controller 218.

Figure 3:
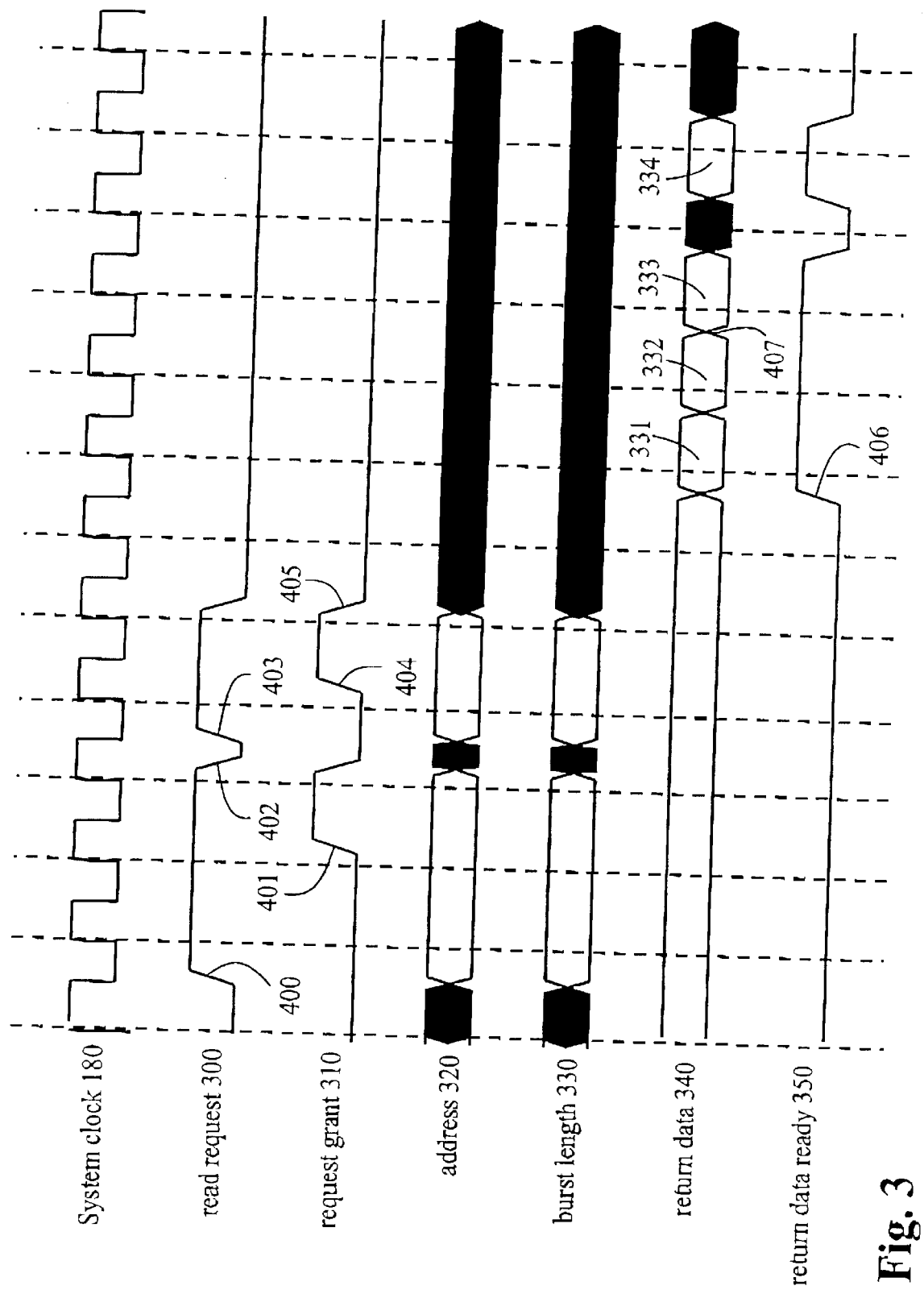
FIG. 3 is a timing diagram of example read transactions.

FIG. 3 shows a timing diagram of an example read transaction where the memory controller 218 issues a second read request before a first read request is completed. The signals shown are the system clock 180, read request 300, request grant 310, read address 320, read data burst length 330, return data 340 and return data ready 350. At an instance 400 the read arbiter 140 issues a read request 300 to the high-speed controller 120. The address 320 and burst length 330 of the transaction is placed on the memory bus 230 at the same time as the request 300 is issued. At a later instance 401 the high-speed controller 120 cause the request grant 310 to go high, thereby accepting the read request 300 from the read arbiter 140. The address 320 and read data burst length 330 are passed to the queue 150. With the read request passed to the high-speed controller 120, the read request 300 may now return to low at instance 402.

At an instance 403, which may be within a cycle of the system clock 180 and even the same as instance 402, the read arbiter 140 issues a second read request to the high-speed controller 120. The address 320 and burst length 330 of the transaction is again placed on the read address and read data burst length busses respectively at the same time as the request 300 goes high. At an instance 404 the high-speed controller 120 cause the grant signal 310 to go high, thereby accepting the read request 300 from the read arbiter 140. The read address 320 and read data burst length 330 are again passed to the queue 150. With the read request 300 granted, the read request 300 returns to low at instance 405.

At an instance 406, which is later than instance 402, and may even be later than the grant of the second read request, thus after instance 405, the read data dispatcher 160 matches the appropriate amount of read data from link 161 with a first entry in the queue 150 and places the return data 340 on link 162. The read data dispatcher 160 also informs the appropriate requestor module 190 that valid return data is available by forcing the return data ready signal 350 high for that requestor module 190. In the example presented, each of the burst lengths of the read requests is 2. Therefore, the first 2 return data bursts 331 and 332 are delivered to a first requestor module 190, whereas return data bursts 333 and 334 are delivered to a second requestor module 190. The first and second requester modules 190 may be the same requester module 190. In this example the first and second requestor modules 190 are the same. The requester module 190 differentiates between data from the first and second transactions by counting the number of words of return data which always arrives in sequence.

In prior art arrangements, a requestor module 190 would have to watt until instance 407, where the return data of the first read request has been received, before the second read request may be issued. However, in the preferred implementation, multiple requests may be issued before the return data is received from the memory 110. In particular, successive requests may even be issued in adjacent cycles of the system clock 180 and before data of a previous transaction has been returned.

The foregoing describes only one embodiment/some embodiments of the present invention, and modifications and/or changes can be made thereto without departing from the scope and spirit of the invention, the embodiment(s) being illustrative and not restrictive.

I claim:

1. A memory controller for controlling memory transactions to and from a memory device in response to memory requests from requestor modules, said memory controller comprising:

at least one arbiter for receiving and processing said memory requests, each memory request being received from a corresponding requestor module;

a controller module for issuing at least memory read transactions to said memory device in response to signals from said at least one arbiter;

an address memory means for receiving the addresses of said requestor modules initiating said memory read transactions in the order that said controller module issued said memory read transactions to said memory device, and for issuing said addresses in said order; and a data dispatcher for receiving data from said controller module in response to said memory read transactions, for receiving a next address in said order from said address memory means, and for passing data associated with each memory read transaction to said corresponding requestor module, wherein said next address is used by said data dispatcher to identify said corresponding requestor module.

2. A memory controller as claimed in claim 1, wherein said at least one arbiter receives and processes at least one of said memory requests while said controller is still controlling data flow in response to a previous one of said signals.

3. A memory controller as claimed in claim 1, said controller module being configured to operate at a frequency that is higher than an operating frequency of said arbiter(s).

4. A memory controller as claimed in claim 3, wherein said controller module receives memory requests in adjacent high-speed controller clock cycles.

5. A method of launching memory transactions to and from a memory in response to memory requests from requestor modules without waiting for completion of a previous memory transaction, said method comprising the steps of:

receiving and processing said memory requests by at least one arbiter, each memory request being received from a corresponding requestor module;

issuing by a controller module at least memory read transactions to said memory device in response to signals from said at least one arbiter;

receiving and issuing by an address memory means the addresses of said requestor modules initiating said memory read transactions in the order that said controller module issued said memory read transactions to said memory device; and receiving data from said controller module by a data dispatcher in response to said memory read transactions, receiving a next address in said order from said address memory means, and passing data associated with each memory read transaction to said corresponding requestor module, wherein said next address is used by said data dispatcher to identify said corresponding requestor module.

6. A method as claimed in claim 5, said controller module being configured to operate at a frequency that is higher than an operating frequency of said arbiter(s).

7. A method as claimed in claim 6, wherein said controller module receives memory requests in adjacent high-speed controller clock cycles.

\* \* \* \* \*

UNITED STATES PATENT AND TRADEMARK OFFICE
CERTIFICATE OF CORRECTION

PATENT NO. : 6,651,148 B2
DATED : November 18, 2003
INVENTOR(S) : Benjamin John Widdup It is certified that error appears in the above-identified patent and that said Letters Patent is hereby corrected as shown below:

Title page,
Item [57], ABSTRACT,
Line 7, "ail" should read -- an --; and
Line 17, "requester" should read -- requestor --.

Column 1,
Line 42, "make" should read -- makes --; and
Line 60, "tat" should read -- that --.

Column 3,
Line 7, "nodule 202" should read -- module 202 --.

Column 5,
Line 3, "it also allows" should read -- then also allow --.

Column 7,
Line 17, "is" should read -- are --; and
Line 20, "cause" should read -- causes --.

Signed and Sealed this

Twenty-first Day of September, 2004

JON W. DUDAS
*Director of the United States Patent and Trademark Office*